(12) United States Patent
Liu et al.

(10) Patent No.: US 10,642,456 B2
(45) Date of Patent: May 5, 2020

(54) APPLICATION DISTRIBUTION METHOD AND DEVICE

(71) Applicant: BEIJING XIAOMI MOBILE SOFTWARE CO., LTD., Beijing (CN)

(72) Inventors: Bo Liu, Beijing (CN); Yizhan Lu, Beijing (CN); Yuqing Zhang, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 0 days.

(21) Appl. No.: 15/987,086

(22) Filed: May 23, 2018

(65) Prior Publication Data
US 2018/0341379 A1 Nov. 29, 2018

(30) Foreign Application Priority Data

May 26, 2017 (CN) .......................... 2017 1 0383769

(51) Int. Cl.
*G06F 3/0484* (2013.01)
*G06F 16/958* (2019.01)
(Continued)

(52) U.S. Cl.
CPC .............. *G06F 3/0484* (2013.01); *G06F 8/60* (2013.01); *G06F 9/451* (2018.02); *G06F 16/95* (2019.01); *G06F 16/958* (2019.01)

(58) Field of Classification Search
CPC ........ G06F 3/0484; G06F 9/451; G06F 16/95; G06F 16/958
See application file for complete search history.

(56) References Cited

U.S. PATENT DOCUMENTS

2007/0260999 A1* 11/2007 Amadio ................ G06F 3/0481
715/804
2008/0082922 A1* 4/2008 Biniak ............... H04N 7/17318
715/719
(Continued)

FOREIGN PATENT DOCUMENTS

CN 101924775 A 12/2010
CN 102045205 A 5/2011
(Continued)

OTHER PUBLICATIONS

European Extended Search Report issued in corresponding EP Patent Application No. 18173906.1, dated Oct. 11, 2018, 8 pages.
(Continued)

*Primary Examiner* — Dino Kujundzic
(74) *Attorney, Agent, or Firm* — Arch & Lake LLP

(57) ABSTRACT

An application distribution method and a device are provided in the technical field of Internet. The method includes that: a card type for a card to be displayed is acquired; card real-time information corresponding to the card type is acquired according to the card type; and the card in a predetermined display format is displayed on a predetermined desktop based on the card real-time information. The card has part of functions of an application program corresponding to the card, and is loaded on the predetermined desktop to directly receive control of a user, and the card has a skipping entry to an intermediate page corresponding to the card.

15 Claims, 5 Drawing Sheets

(51) Int. Cl.
*G06F 8/60* (2018.01)
*G06F 9/451* (2018.01)
*G06F 16/95* (2019.01)

(56) References Cited

U.S. PATENT DOCUMENTS

| | | | | |
|---|---|---|---|---|
| 2008/0235602 | A1* | 9/2008 | Strauss | G06F 9/451 715/762 |
| 2009/0235149 | A1* | 9/2009 | Frohwein | G06F 16/9535 715/205 |
| 2011/0099487 | A1* | 4/2011 | Pyhalammi | G06F 8/38 715/762 |
| 2012/0124061 | A1* | 5/2012 | Macbeth | G06F 9/445 707/749 |
| 2012/0137227 | A1* | 5/2012 | Gerken, III | G06F 8/38 715/747 |
| 2013/0125055 | A1 | 5/2013 | Nakaya et al. | |
| 2013/0139109 | A1* | 5/2013 | Kim | G06F 3/04883 715/835 |
| 2015/0095819 | A1 | 4/2015 | Hong | |
| 2016/0104116 | A1* | 4/2016 | Greenberg | G06Q 10/105 705/320ke |
| 2016/0196010 | A1* | 7/2016 | Sheha | G06Q 30/02 715/780 |

FOREIGN PATENT DOCUMENTS

| | | |
|---|---|---|
| CN | 102946599 A | 2/2013 |
| CN | 103607626 A | 2/2014 |
| CN | 106296255 A | 1/2017 |
| EP | 2600235 A2 | 6/2013 |

OTHER PUBLICATIONS

Anonymous: "App Widgets : Android Developers", Aug. 6, 2013 (Aug. 6, 2013), XP055364504, Retrieved from the Internet: URL:https://web-beta.archive.org/web/20130806035030/http://developer.android.com/guide/topics appwidgets/index. html [retrieved on Apr. 12, 2017].
First Office Action of the Chinese Application No. 201710383769.X, dated Jul. 15, 2019 and English translation (16p).
First Office Action issued to European Patent Application No. 18173906.1, dated Oct. 11, 2019, (6p).

* cited by examiner

APPLICATION DISTRIBUTION METHOD AND DEVICE

CROSS-REFERENCE TO RELATED APPLICATIONS

This application is filed based upon and claims priority to Chinese Patent Application No. 201710383769.X, filed on May 26, 2017, the entire contents of which are incorporated herein by reference.

TECHNICAL FIELD

The present disclosure generally relates to the technical field of Internet, and more particularly, to an application distribution method and device.

BACKGROUND

Along with rapid development of the Internet technology, more and more users use applications on terminals for operations such as reading articles, planning trips, and news browsing in daily life. For a terminal, multiple applications which currently have been installed by a user may be displayed on a desktop of the terminal, and when the user clicks and enters a certain application, a specific content in the application may be displayed on a screen of the terminal. In order to enable the user to use a basic function of a certain application without entering the application, for the application, its developer may develop a widget of the application. The widget is a shortcut display page developed by the developer of the application in response to an operating system standard of the terminal, the basic function of the corresponding application may be displayed on the widget, and the user may add the widget of the application to the desktop and more conveniently and quickly use the basic function of the application based on the widget of the application without entering the application.

In a related technology, a user may add a widget of an application at any position on a desktop of a terminal and view an interested text, a commuter route plan, a tourist attraction recommendation and the like through the added widget, so that the user may conveniently and more quickly view important information in the application through the widget.

In a process of implementing the present disclosure, the inventor finds that the related technology at least has the following problems.

When a developer of each application designs a widget of the application, widgets of different styles may be designed, thereby causing a poor visual effect of a desktop of a terminal. Moreover, a user may add and use the widget of a certain application on the desktop only after downloading the application, so that use of the widget is limited by whether the application is downloaded or not. If the application is not installed, the corresponding widget may not be used, so that an application range of the widget is greatly limited. Therefore, there is an urgent need for a technical solution for distributing an application based on a widget.

SUMMARY

According to a first aspect of the present disclosure, an application distribution method is provided. The method may include: acquiring a card type for a card to be displayed; acquiring card real-time information corresponding to the card type according to the card type; and displaying the card in a predetermined display format on a predetermined desktop on the basis of the card real-time information. The card has part of functions of an application program corresponding to the card, and is loaded on the predetermined desktop to directly receive control of a user, and the card has a skipping entry to an intermediate page corresponding to the card.

According to a second aspect of the present disclosure, an application distribution device is provided. The device may include: a type acquisition module, configured to acquire a card type to be displayed; an information acquisition module, configured to acquire card real-time information corresponding to the card type according to the card type; and a display module, configured to display a card in a predetermined display format on a predetermined desktop based on the card real-time information, wherein the card has part of functions of an application program corresponding to the card, and is loaded on the predetermined desktop to directly receive control of a user, and the card has a skipping entry to an intermediate page corresponding to the card.

According to a third aspect of the present disclosure, an application distribution device is provided. The device includes: a processor; and a memory configured to store instructions executable for the processor. The processor is configured to: acquire a card type to be displayed; acquire card real-time information corresponding to the card type according to the card type; and display a card in a predetermined display format on a predetermined desktop based on the card real-time information, wherein the card has part of functions of an application program corresponding to the card, and is loaded on the predetermined desktop to directly receive control of a user, and the card has a skipping entry to an intermediate page corresponding to the card.

According to a fourth aspect of the present disclosure, a non-transitory computer-readable storage medium is provided, wherein instructions are stored on the non-transitory computer-readable storage medium, and the instructions are executed by a processor to implement acts including: acquiring a card type for a card to be displayed; acquiring card real-time information corresponding to the card type according to the card type; and displaying a card in a predetermined display format on a predetermined desktop on the basis of the card real-time information. The card has part of functions of an application program corresponding to the card, and is loaded on the predetermined desktop to directly receive control of a user, and the card has a skipping entry to an intermediate page corresponding to the card.

It should be understood that the above general descriptions and detailed descriptions below are only exemplary and explanatory and not intended to limit the present disclosure.

BRIEF DESCRIPTION OF THE DRAWINGS

Accompanying drawings, which are incorporated in and constitute a part of this specification, illustrate embodiments consistent with the present disclosure and, together with the description, serve to explain the principles of the present disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of apparatuses and methods consistent with aspects related to the present disclosure as recited in the appended claims.

Figure 1:
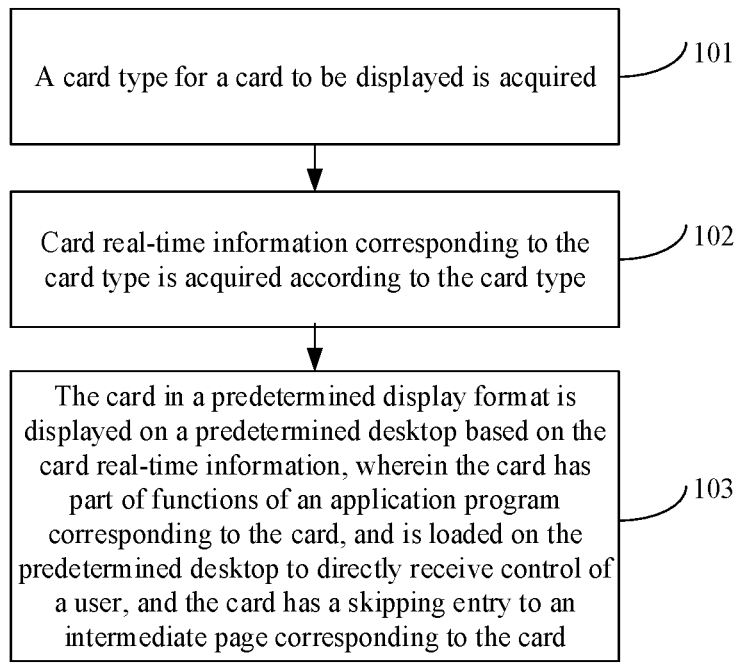
FIG. 1 is a flow chart showing an application distribution method, according to an aspect of the disclosure.

FIG. 1 is a flow chart showing an application distribution method, according to an aspect of the disclosure. As shown in FIG. 1, the method includes the following steps.

In Step 101, a card type for a card to be displayed is acquired. The card may also be referred as an application card, which is a standard program interface for an application program in an application store. The application programs may be installed on a device running a specific operating system. The card type may indicate which type of application program the card is related to. For example, when the application program is a news application, the card type of the corresponding card may be set as "News." Similarly, when the application program is a sports application, the card type of the corresponding card may be set as "Sports."

In Step 102, card real-time information corresponding to the card type is acquired according to the card type. Here, the card real-time information may include a content part to be displayed on the card, for example, a reminder, a notification or the like provided by a corresponding application program.

In Step 103, the card in a predetermined display format is displayed on a predetermined desktop based on the card real-time information, wherein the card has part of functions of an application program corresponding to the card, and is loaded on the predetermined desktop to directly receive control of a user, and the card has a skipping entry to an intermediate page corresponding to the card. The skipping entry may be for example an interface whereby the intermediate page may be accessed for viewing more information or downloading the corresponding application program.

According to the method provided by the present disclosure, the card real-time information corresponding to the card type is acquired according to the card type to be displayed, and the card in the predetermined format is displayed on the predetermined desktop based on the card real-time information, so that a user may use part of functions of the application program corresponding to the card even when the application program is not downloaded. Further, the user may further skip to the intermediate page to know about more contents and download the application program, not only a utilization rate of the card is increased, but also the number of downloads of the application program is increased, and an application range of the application program is extended.

In another embodiment, the step that the card real-time information corresponding to the card type is acquired according to the card type includes that:

the card type is sent to a specified server, the specified server interacts with an application server corresponding to the card type and returns the card real-time information; and the card real-time information is received.

In another embodiment, the predetermined display format includes: a title part, a content part, and a function part, where the title part is configured to display the card type, the content part is configured to display the card real-time information, and the function part is configured to provide a specified function of the card.

In another embodiment, the method further includes that:

when the skipping entry to the intermediate page is triggered, the intermediate page is loaded and displayed, wherein the intermediate page is a webpage, and is provided by the application server of the card.

In another embodiment, the step that the card type to be displayed is acquired includes that:

a card type list is acquired, where the card type list includes at least one interested card type set by a user; and the card type to be displayed is acquired from the card type list.

All of the abovementioned optional technical solutions may be freely combined into optional embodiments of the present disclosure, which will not be elaborated herein one by one.

Figure 2A:
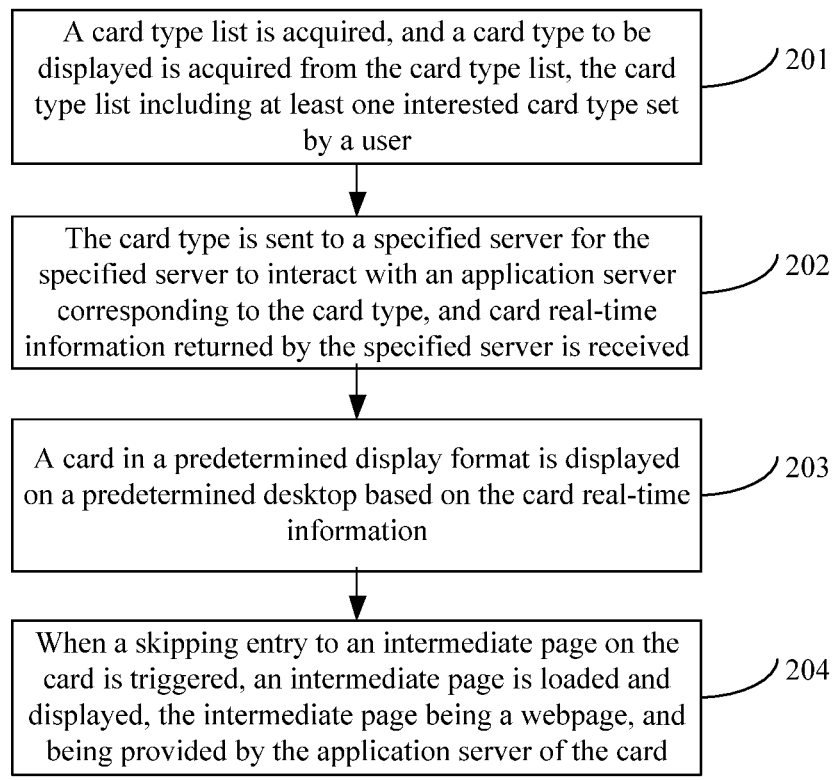
FIG. 2A is a flow chart showing an application distribution method, according to an aspect of the disclosure.

FIG. 2A is a flow chart showing an application distribution method, according to an aspect of the disclosure. As shown in FIG. 2A, the method includes the following steps 201-204.

In Step 201, a card type list is acquired, and a card type to be displayed is acquired from the card type list, the card type list including at least one interested card type set by a user.

In one or more embodiments of the present disclosure, for each application program in an application store, there is a card corresponding to the application program. The card has part of functions of the corresponding application program and a skipping entry to an intermediate page of the application program, and may be loaded on a predetermined desktop to directly receive control of the user. In other words, the user may use part of functions of the application program corresponding to the card on the card, and may also request to skip to the intermediate page of the application program on the card. For example, the intermediate page may be a webpage, and may be a HyperText Markup Language 5.0 (HTML 5) page or a generic mini application page, which is provided by an application server of a card. A developer of the application program designs a content to be designed, which may be a content of the application program such as a tagline and an advertising slogan, on the intermediate page. The application server stores the intermediate page.

Figure 2B:
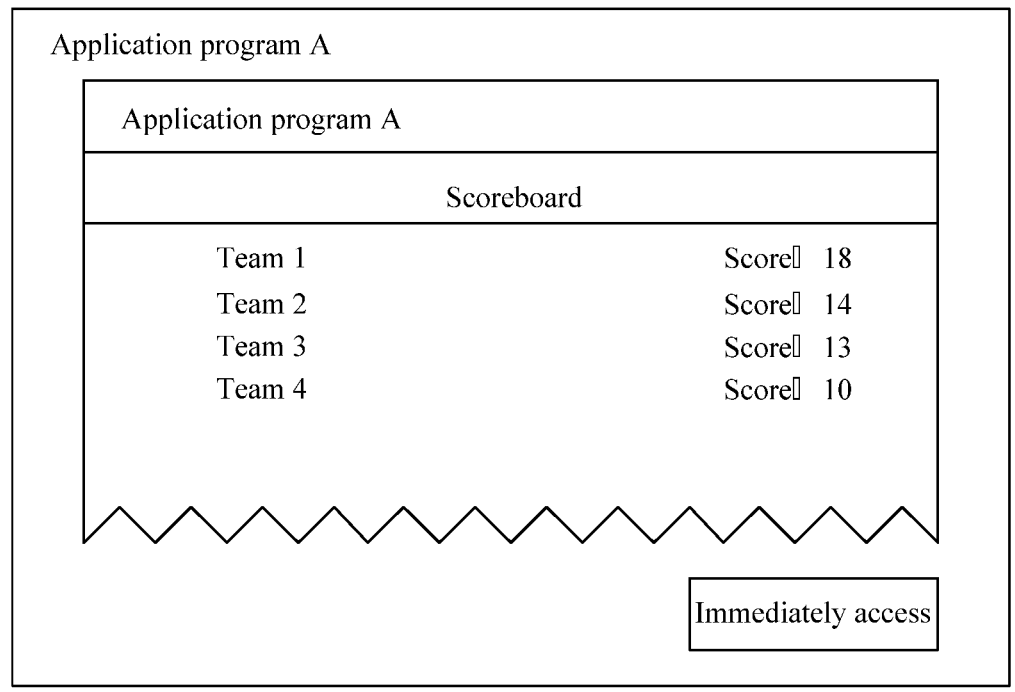
FIG. 2B is a schematic diagram illustrating an application distribution method, according to an aspect of the disclosure.

For example, referring to FIG. 2B, a specified desktop includes a card of an application program A, the user may view a "scoreboard" on the card of the application program A, moreover, an "immediately access" button is further provided on the card of the application program A, and when a terminal detects the user triggers the "immediately access" button, it is determined that the current user is required to skip to the intermediate page, and skipping to an intermediate page of the application program A may be executed.

The inventor realizes that: for the user of the terminal, when the terminal is used, the user expects that cards displayed on the predetermined desktop are cards in which the user is interested, so that the terminal may provide a card type setting function for the user. Thus, the user may select card types in which the user is interested based on the card type setting function, where the card types may be a sports type, a news type, a travel type and the like. When the terminal detects that the user triggers the card type setting function, the terminal may request a specified server for all card types which are currently included, display all the card types returned by the specified server to the user, acquire card types selected by the user, generate a card type list based on the card types selected by the user and store the card type list. When the cards are displayed on the predetermined desktop, for displaying the cards according to degrees of interests of the user in the cards to display the card with the higher degree of interests of the user at the top of the predetermined desktop, card display priority setting may be added when the user sets the card types, so that the cards are sequenced for display according to priorities of the cards during subsequent card display, and the card in which the user is most interested is displayed at the top of the predetermined desktop.

For the terminal, the number of the cards displayed on the predetermined desktop may also be autonomously set by the user. The terminal may provide a number setting function, and when it is detected that the user triggers the number setting function, a number setting page is displayed, a number input box is displayed on the number setting page, a number input in the number input box by the user is acquired, and the number is determined as a preset number of the cards displayed on the predetermined page. In such a manner, when the user subsequently requests to display the cards on the predetermined desktop, the preset number of the cards may be displayed. Accordingly, the method avoid troubles caused by an excessive number of cards may need to be displayed to the user. If the preset number of cards cannot be displayed on the predetermined desktop at the same time, part of the cards may be displayed on the predetermined desktops, and when a slide of the user on the predetermined desktop is detected, the other part of the cards are displayed, so that it is ensured that the preset number of cards may be browsed by the user.

After the abovementioned process of determining the card type list, when the terminal detects that the user triggers display of the predetermined desktop, it is determined that the cards are currently required to be displayed on the predetermined desktop, and at this moment, the terminal may acquire the generated card type list and acquire the card type to be displayed from the card type list to subsequently determine the card to be displayed according to the card type to be displayed.

In Step 202, the card type is sent to a specified server which interacts with an application server corresponding to the card type, and card real-time information returned by the specified server is received.

In one or more embodiments of the present disclosure, the specified server refers to a server to which the terminal is belonged, i.e. a developer of the terminal, and the application server refers to a server providing service for the application program, i.e. a developer of the application program. A card of each application program is provided by the application server, so that: when the card real-time information is displayed according to the card type, the specified server of the terminal is required to determine the corresponding application program according to the card type, determine the application server according to the application program, request the application server for the card real-time information and send the card real-time information returned by the application server to the terminal such that the card real-time information is displayed by the terminal on the predetermined desktop.

Before acquiring the card type sent by the terminal, the specified server may store each card type in all the card types and an application program corresponding to the each card type in a one-to-one corresponding manner to determine the application program according to the card type. A corresponding relationship between the card types and the application programs is preset, and the server is only required to correspondingly store the card types and the application programs. Accordingly, when the terminal subsequently requests to acquire the card real-time information, the server may acquire the application program corresponding to the card type, determine the application server of the application program, interact with the application server and send the card real-time information returned by the application server to the terminal, such that the card real-time information is displayed by the terminal.

During a practical application process, the corresponding relationship between the card types and the application programs may also be stored at least partially by the terminal. Therefore, when the terminal detects that the user triggers display of the predetermined desktop, the terminal may determine multiple application programs according to multiple card types in the card type list, send application identifiers of the application programs to the specified server, and the specified server determines application servers of the application programs according to the application identifiers and requests the application servers for card real-time information, the application server turns the card real-time information, and the specified server sends the card real-time information to the terminal for the terminal to display.

Generally, there is a unique application program corresponding to each card type in all the card types, so that: when interacting with the application server based on the card type, the specified server may directly determine the application server according to the application program corresponding to the card type and request the application server for the card real-time information.

In Step 203, a card in a predetermined display format is displayed on a predetermined desktop based on the card real-time information.

In the embodiments of the present disclosure, the predetermined desktop is configured to display the card including the card real-time information. Here, the predetermined desktop may be a leftmost screen of the terminal, where the leftmost screen is another page added based on multiple pages, which may be displayed, of the current terminal. The predetermined desktop is configured to display the cards and the card real-time information and provide simple service. Here, a form of the predetermined desktop will not be specifically limited in the present disclosure. The cards may be displayed and run on the predetermined desktop only. The predetermined display formats of the cards are set in a unified manner, and all the cards required to be displayed on the predetermined desktop are cards in the predetermined display format.

The predetermined display format is set by the developer of the terminal, and is used to specify forms of cards developed by the application developer. After the developer of the terminal finishes setting the predetermined display format, the predetermined display format will be sent to the application developer, and the application developer designs the cards according to the predetermined display format and sends the designed cards to the specified server, and the specified server transmits them to the terminal, and the terminal displays the cards. The predetermined display format includes: a title part, a content part and a function part, wherein the title part is configured to display the card type, the content part is configured to display the card real-time information, and the function part is configured to provide a specified function of the card. For example, referring to a card shown in FIG. 2C, for the card, its title part is "application program B", and represents that a card type of the card is application program B; a content part is "fundamentals of collage computer", "main building C108", "advanced mathematics 2" and "east eighth teaching building A106", and represents card real-time information of the card; and a function part is a triangle on a right side, and the user may slide on the triangle to acquire and transmit more course information.

Figure 2C:
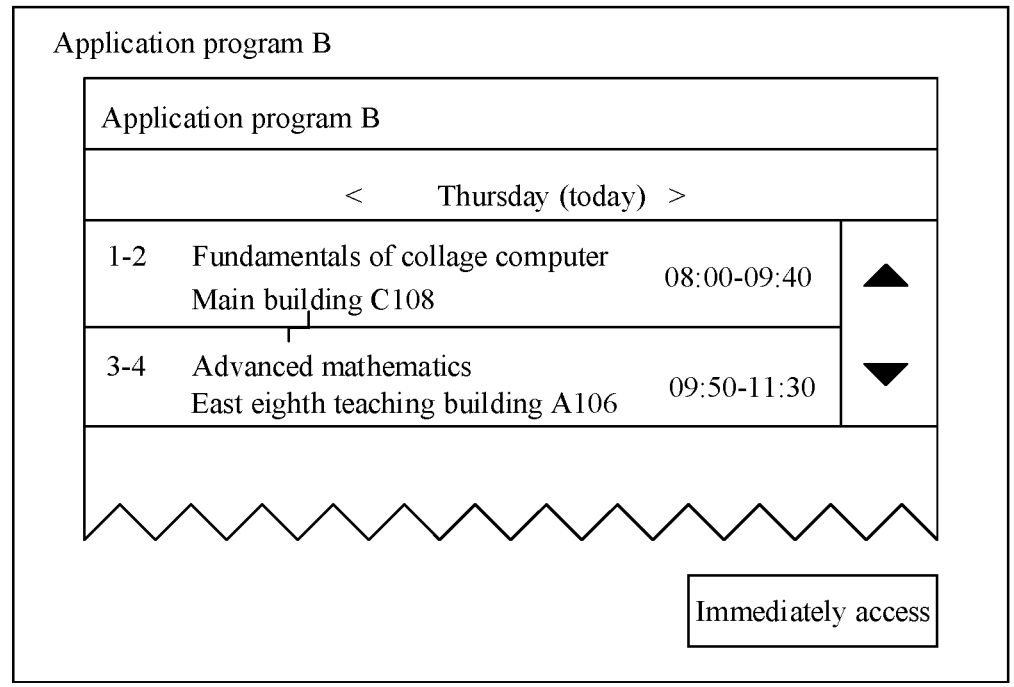
FIG. 2C is a schematic diagram illustrating an application distribution method, according to an aspect of the disclosure.

In FIG. 2C an "immediately access" button is an entry provided by the card for skipping to an intermediate page. When it is detected that the user triggers the "immediately access" button, the terminal may skip to the intermediate page of the application program B, and the user may browse a content provided by the intermediate page in the intermediate page and select a next operation. For an application program installed in the terminal, when card real-time information of a card corresponding to this application program is displayed, an entry to the intermediate page of the application program may be eliminated, meanwhile, an entering button of the application program is added, and when it is detected that the user triggers the entering button, the terminal enters the application program, and the user may enter the application program and use all functions of the application program.

During the practical application process, the entry provided by the terminal based on the card for skipping to the intermediate page may also be in a "view more information" form. The inventor realizes that part of functions of the application program provided by the card may not meet a requirement of the user, and the user may want more functions and information about the application program after using part of functions on the card. Therefore, a "view more information" button may be set on the card, and when it is detected that the user triggers the button, skipping to the intermediate page of the application program is executed, and the user may browse information provided by the intermediate page and download the application program on the intermediate page to acquire more information about the application program. In addition, for the application program installed in the terminal, when it is detected that the user triggers the "view more information" button, the entry to the intermediate page of the application program may be eliminated, and the terminal may directly enter the application program.

In Step 204, when an entry for skipping to the intermediate page on the card is triggered, an intermediate page is loaded and displayed, where the intermediate page is a webpage, and is provided by the application server of the card.

In one or more embodiments of the present disclosure, for each card, if an intermediate page corresponding to the card may provide downloading service for an application program corresponding to the card, before the card is used, it is necessary to bind the intermediate page corresponding to the card and a downloading page of the application program corresponding to the card in the application store, so that skipping from the intermediate page corresponding to the card to the downloading page of the application program corresponding to the card in the application store may be directly executed to finish distribution of the application program based on the card of the application program when it is detected that a downloading entry on the intermediate page is triggered. The application store is provided by the specified server to which the terminal is belonged, and is namely provided by the developer of the terminal. The application developer may send a downloading address of the application program to the specified server of the developer of the terminal, and the specified server records the downloading address of the application program into the application store, so that the terminal may provide the downloading page of the application program based on the application store to ensure that the user may download the application program from the downloading page of the application program.

Since the user may directly operate on the card to implement a process of skipping from the card to the intermediate page corresponding to the card, the user may learn more about the application program or the application developer according to the content on the intermediate page, thereby deciding whether to download the application program corresponding to the card or not. Therefore, the number of downloads of the application program is increased, the knowledge of the user about the application program is further improved, popularization of the application program is implemented to a certain extent, and an application range of the application program is extended.

Figure 2D:
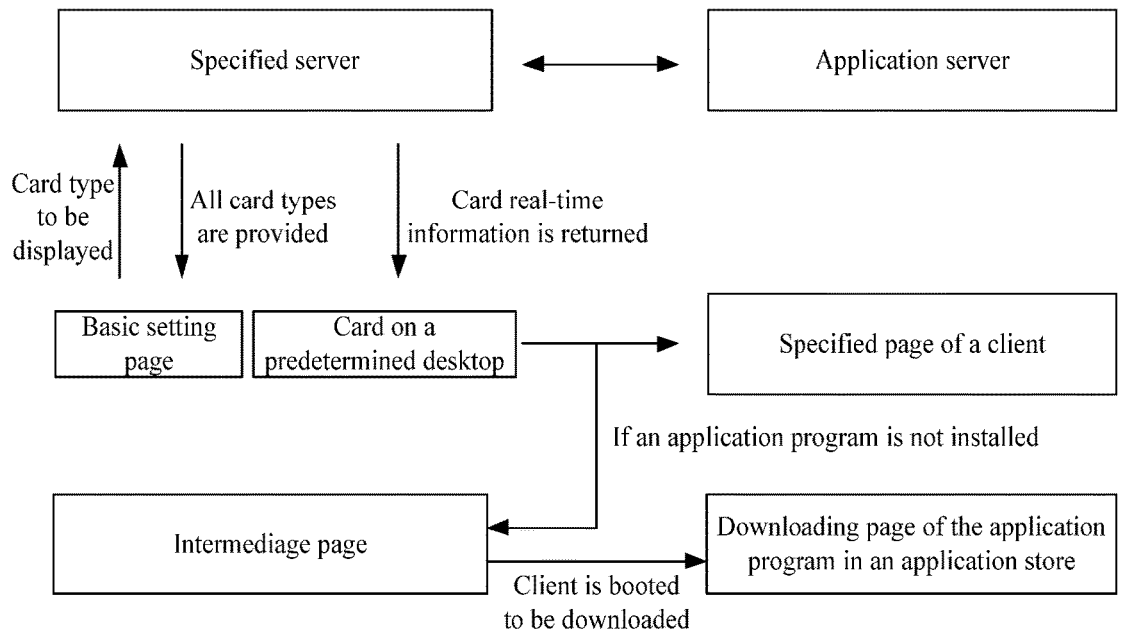
FIG. 2D is a flow chart showing an application distribution method, according to an aspect of the disclosure.

During the practical application process, referring to FIG. 2D, the terminal may implement distribution of the application program based on the flow shown in the FIG. 2D: the terminal may acquire the card type provided by the specified server, generate and display a basic setting page based on the card type and provide the card type setting function on the basic setting page; the terminal acquires the card type to be displayed set by the user on the basic setting page, generates the card type list, and uploads the card type list to the specified server, and the specified server returns the card real-time information to the terminal according to the card type list such that the card real-time information is displayed on the predetermined desktop of the terminal; when it is detected that the entry to the intermediate page on the card is triggered, the terminal skips to the intermediate page of the application program corresponding to the card, displays the content of the intermediate page, and when the user triggers the downloading entry to the application program on the intermediate page, skips to the downloading page of the application program in the application store; and for the application program which has been downloaded, when it is detected that the user triggers acquisition of more information about the application program, skipping from the card of the application program to the specified page of the application program may be executed to enable the user to acquire more information in the application program.

According to the method in the present disclosure, the card real-time information corresponding to the card type is acquired according to the card type to be displayed, and the card in the predetermined format is displayed on the predetermined desktop based on the card real-time information, so that: under the condition that the application program is not downloaded, the user may use part of functions of the application program corresponding to the card, and may further skip to the intermediate page to know about more contents and download the application program, not only a utilization rate of the card is increased, but also the number of the downloads of the application program is increased, and the application range of the card is extended.

Figure 3A:
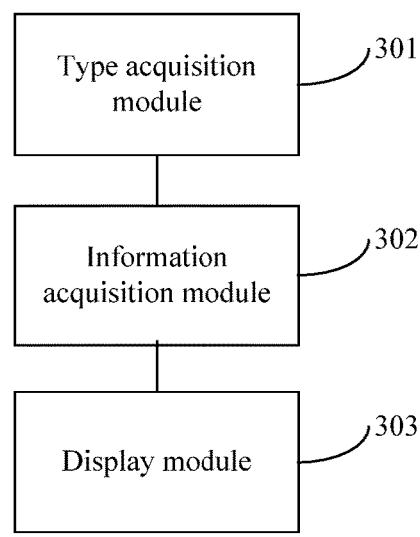
FIG. 3A is a block diagram of an application distribution device, according to an aspect of the disclosure.

FIG. 3A is a block diagram of an application distribution device, according to an aspect of the disclosure. Referring to FIG. 3A, the device includes a type acquisition module 301, an information acquisition module 302 and a display module 303.

The type acquisition module 301 is configured to acquire a card type to be displayed;

the information acquisition module 302 is configured to acquire card real-time information corresponding to the card type according to the card type; and the display module 303 is configured to display a card in a predetermined display format on a predetermined desktop based on the card real-time information, wherein the card has part of functions of a corresponding application program, and is loaded on the predetermined desktop to directly receive control of a user, and the card has a skipping entry to an intermediate page corresponding to the card.

According to the device provided by the present disclosure, the card real-time information corresponding to the card type is acquired according to the card type to be displayed, and the card in the predetermined format is displayed on the predetermined desktop based on the card real-time information, so that: under the condition that the application program is not downloaded, a user may use part of functions of the application program corresponding to the card, and may further skip to the intermediate page to know about more contents and download the application program, not only a utilization rate of the card is increased, but also the number of downloads of the application program is increased, and an application range of the card is extended.

Figure 3B:
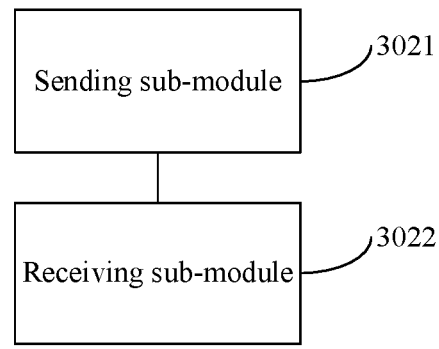
FIG. 3B is a block diagram of an application distribution device, according to an aspect of the disclosure.

In another embodiment, referring to FIG. 3B, the information acquisition module 302 includes a sending sub-module 3021 and a receiving sub-module 3022.

The sending sub-module 3021 is configured to send a card type to a specified server, wherein the specified server returns card real-time information by interaction with an application server corresponding to the card type; and the receiving sub-module 3022 is configured to receive the card real-time information.

In another embodiment, the predetermined display format includes: a title part, a content part and a function part, wherein the title part is configured to display the card type, the content part is configured to display the card real-time information, and the function part is configured to provide a specified function of the card.

Figure 3C:
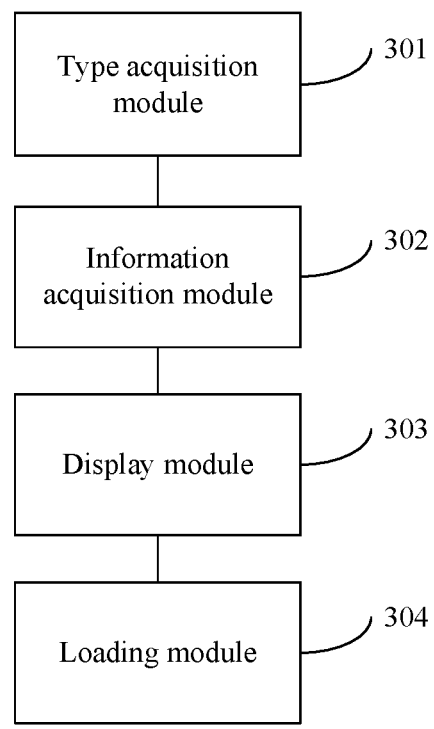
FIG. 3C is a block diagram of an application distribution device, according to an aspect of the disclosure.

In another embodiment, referring to FIG. 3C, the device further includes a loading module 304.

The loading module 304 is configured to, when the skipping entry to the intermediate page is triggered, load and display the intermediate page, wherein the intermediate page is a webpage, and is provided by the application server of the card.

Figure 3D:
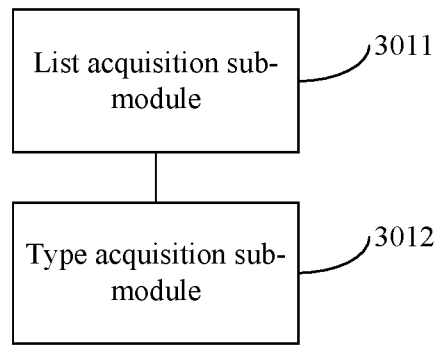
FIG. 3D is a block diagram of an application distribution device, according to an aspect of the disclosure.

In another embodiment, referring to FIG. 3D, the type acquisition module 301 includes a list acquisition sub-module 3011 and a type acquisition sub-module 3012.

The list acquisition sub-module 3011 is configured to acquire a card type list, the card type list including at least one interested card type set by a user; and the type acquisition sub-module 3012 is configured to acquire the card type to be displayed from the card type list.

With respect to the device in the above embodiments, the specific manners for performing operations for individual modules therein have been described in detail in the embodiment regarding the method, which will not be elaborated herein.

Figure 4:
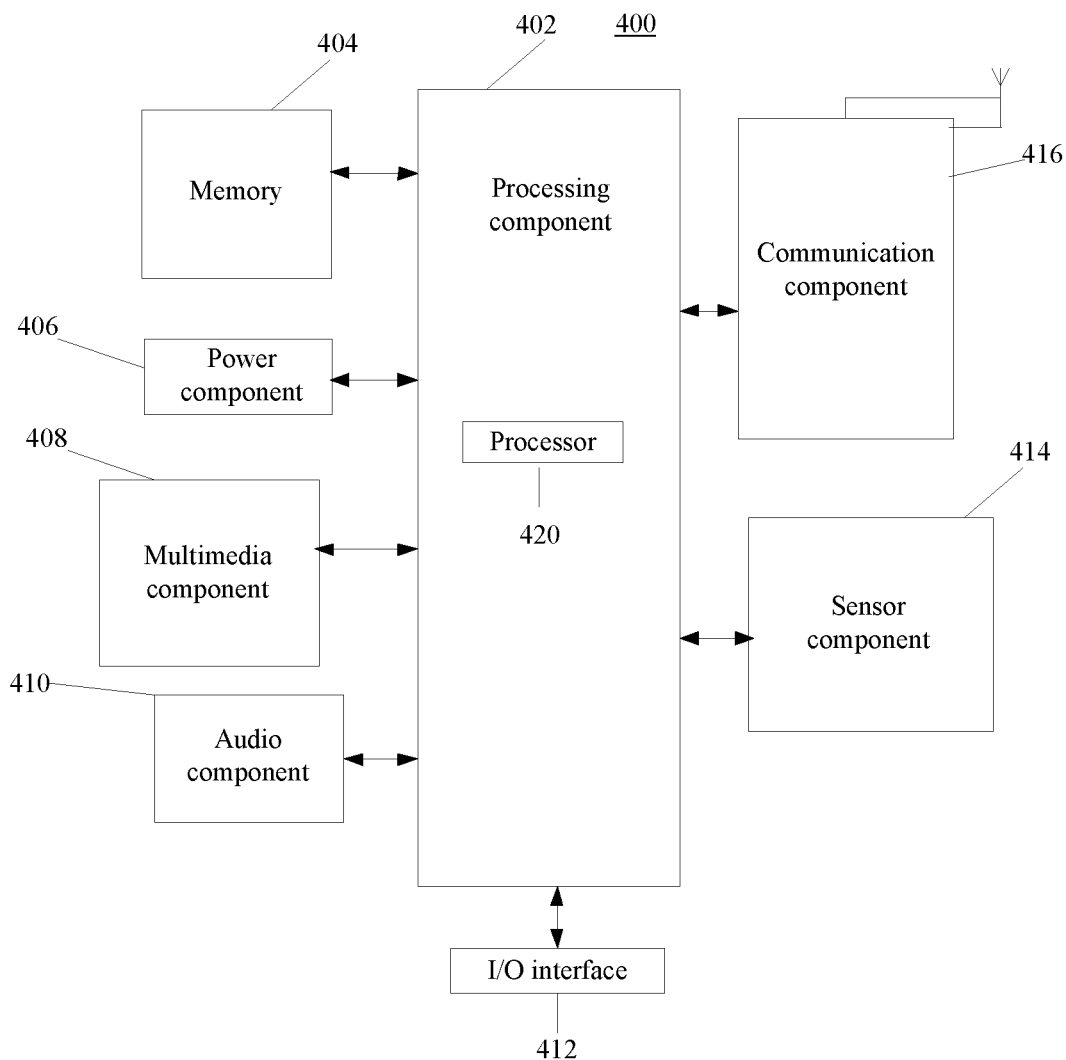
FIG. 4 is a block diagram of an application distribution device 400, according to an aspect of the disclosure.

FIG. 4 is a block diagram of an application distribution device 400, according to an aspect of the disclosure. For example, the device 400 may be a mobile phone, a computer, a digital broadcast terminal, a messaging device, a gaming console, a tablet, a medical device, exercise equipment, a personal digital assistant and the like.

Referring to FIG. 4, the device 400 may include one or more of the following components: a processing component 402, a memory 404, a power component 406, a multimedia component 408, an audio component 410, an Input/Output (I/O) interface 412, a sensor component 414, and a communication component 416.

The processing component 402 typically controls overall operations of the device 400, such as the operations associated with display, telephone calls, data communications, camera operations, and recording operations. The processing component 402 may include one or more processors 420 to execute instructions to perform all or part of the steps of the abovementioned method. Moreover, the processing component 402 may include one or more modules which facilitate interaction between the processing component 402 and the other components. For instance, the processing component 402 may include a multimedia module to facilitate interaction between the multimedia component 408 and the processing component 402.

The memory 404 is configured to store various types of data to support the operation of the device 400. Examples of such data include instructions for any application programs or methods operated on the device 400, contact data, phonebook data, messages, pictures, video, etc. The memory 404 may be implemented by any type of volatile or non-volatile memory devices, or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, and a magnetic or optical disk.

The power component 406 provides power for various components of the device 400. The power component 406 may include a power management system, one or more power supplies, and other components associated with the generation, management and distribution of power for the device 400.

The multimedia component 408 includes a screen providing an output interface between the device 400 and a user. In some embodiments, the screen may include a Liquid Crystal Display (LCD) and a Touch Panel (TP). If the screen includes the TP, the screen may be implemented as a touch screen to receive an input signal from the user. The TP includes one or more touch sensors to sense touches, swipes and gestures on the TP. The touch sensors may not only sense a boundary of a touch or swipe action, but also detect a duration and pressure associated with the touch or swipe action. In some embodiments, the multimedia component 408 includes a front camera and/or a rear camera. The front camera and/or the rear camera may receive external multimedia data when the device 400 is in an operation mode, such as a photographing mode or a video mode. Each of the front camera and the rear camera may be a fixed optical lens system or have focusing and optical zoom capabilities.

The audio component 410 is configured to output and/or input an audio signal. For example, the audio component 410 includes a Microphone (MIC), and the MIC is configured to receive an external audio signal when the device 400 is in the operation mode, such as a call mode, a recording mode and a voice recognition mode. The received audio signal may be further stored in the memory 404 or sent through the communication component 416. In some embodiments, the audio component 410 further includes a speaker configured to output the audio signal.

The I/O interface 412 provides an interface between the processing component 402 and a peripheral interface module, and the peripheral interface module may be a keyboard, a click wheel, a button and the like. The button may include, but not limited to: a home button, a volume button, a starting button and a locking button.

The sensor component 414 includes one or more sensors configured to provide status assessment in various aspects for the device 400. For instance, the sensor component 414 may detect an on/off status of the device 400 and relative positioning of components, such as a display and small keyboard of the device 400, and the sensor component 414 may further detect a change in a position of the device 400 or a component of the device 400, presence or absence of contact between the user and the device 400, orientation or acceleration/deceleration of the device 400 and a change in temperature of the device 400. The sensor component 414 may include a proximity sensor configured to detect presence of an object nearby without any physical contact. The sensor component 414 may also include a light sensor, such as a Complementary Metal Oxide Semiconductor (CMOS) or Charge Coupled Device (CCD) image sensor, configured for use in an imaging application. In some embodiments, the sensor component 414 may also include an acceleration sensor, a gyroscope sensor, a magnetic sensor, a pressure sensor or a temperature sensor.

The communication component 416 is configured to facilitate wired or wireless communication between the device 400 and other equipment. The device 400 may access a communication-standard-based wireless network, such as a Wireless Fidelity (WiFi) network, a 2nd-Generation (2G) or 3rd-Generation (3G) network or a combination thereof. In an aspect of the disclosure, the communication component 416 receives a broadcast signal or broadcast associated information from an external broadcast management system through a broadcast channel. In an aspect of the disclosure, the communication component 416 further includes a Near Field Communication (NFC) module to facilitate short-range communication. For example, the NFC module may be implemented based on a Radio Frequency Identification (RFID) technology, an Infrared Data Association (IrDA) technology, an Ultra-WideBand (UWB) technology, a Bluetooth (BT) technology and another technology.

In an aspect of the disclosure, the device 400 may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, micro-controllers, microprocessors or other electronic components, and is configured to execute the abovementioned application distribution method.

In an aspect of the disclosure, there is also provided a non-transitory computer-readable storage medium including instructions, such as the memory 404 including instructions, and the instructions may be executed by the processor 420 of the device 400 to implement the abovementioned method. For example, the non-transitory computer-readable storage medium may be a ROM, a Random Access Memory (RAM), a Compact Disc Read-Only Memory (CD-ROM), a magnetic tape, a floppy disc, optical data storage equipment and the like. According to a non-transitory computer-readable storage medium, instructions in the storage medium are executed by the processor of the application distribution device to enable the application distribution device to execute the abovementioned application distribution method.

A computer-readable storage medium is provided, in which instructions are stored, the instruction being executed by the processor to implement the abovementioned application distribution method.

Computer equipment is provided, which includes a memory, a processor and a computer-executable instructions stored on the memory and capable of running on the processor, and the processor executes the computer-executable instructions to implement the abovementioned application distribution method.

Other embodiments of the present disclosure will be apparent to those skilled in the art from consideration of the specification and practice of the present disclosure. This application is intended to cover any variations, uses, or adaptations of the present disclosure following the general principles thereof and including such departures from the present disclosure as come within known or customary practice in the art. It is intended that the specification and examples be considered as exemplary only, with a true scope and spirit of the present disclosure being indicated by the following claims.

It will be appreciated that the present disclosure is not limited to the exact construction that has been described above and illustrated in the accompanying drawings, and that various modifications and changes may be made without departing from the scope thereof. It is intended that the scope of the present disclosure only be limited by the appended claims.

What is claimed is:

1. A method for distributing application cards, comprising:
   acquiring a card type for a card to be displayed, wherein the card responds to an application program;
   acquiring card real-time information corresponding to the card type according to the card type; and
   displaying the card in a predetermined display format on a predetermined desktop based on the card real-time information, wherein the card being displayed comprises an entry skipping to an intermediate page corresponding to the card;
   determining whether to download the application program based on the intermediate page; and
   wherein the card has part of functions of the application program, and is loaded on the predetermined desktop to directly receive control of a user.

2. The method of claim 1, wherein acquiring the card real-time information corresponding to the card type according to the card type comprises:
   sending the card type to a specified server, wherein the specified server returns the card real-time information by interaction with an application server corresponding to the card type; and
   receiving the card real-time information.

3. The method of claim 1, wherein the predetermined display format comprises: a title part, a content part, and a function part, wherein the title part is configured to display the card type, the content part is configured to display the card real-time information, and the function part is configured to provide a specified function of the card.

4. The method of claim 1, further comprising:
when the entry skipping to the intermediate page is triggered, loading and displaying the intermediate page, and
wherein the intermediate page is a webpage that is provided by an application server of the card.

5. The method of claim 1, wherein acquiring the card type to be displayed comprises:
acquiring a card type list, the card type list comprising at least one interested card type set by the user; and
acquiring the card type to be displayed from the card type list.

6. An application distribution device, comprising:
a processor; and
a memory configured to store instructions executable for the processor,
wherein the processor is configured to: acquire a card type for a card to be displayed, wherein the card responds to an application program; acquire card real-time information corresponding to the card type according to the card type; and display the card in a predetermined display format on a predetermined desktop based on the card real-time information, wherein the card being displayed comprises an entry skipping to an intermediate page corresponding to the card; determining whether to download the application program based on the intermediate page; and
wherein the card has part of functions of the application program, and is loaded on the predetermined desktop to directly receive control of a user.

7. The application distribution device of claim 6, wherein the processor is further configured to:
send the card type to a specified server, wherein the specified server returns the card real-time information by interaction with an application server corresponding to the card type; and
receive the card real-time information.

8. The application distribution device of claim 6, wherein the predetermined display format comprises: a title part, a content part and a function part, wherein the title part is used to display the card type, the content part is used to display the card real-time information, and the function part is used to provide a specified function of the card.

9. The application distribution device of claim 6, wherein the processor is further configured to: load and display the intermediate page, when the entry skipping to the intermediate page is triggered, and
wherein the intermediate page is a webpage that is provided by an application server of the card.

10. The application distribution device of claim 6, wherein the processor is further configured to:
acquire a card type list, the card type list comprising at least one interested card type set by the user; and
acquire the card type to be displayed from the card type list.

11. A non-transitory computer-readable storage medium, wherein instructions are stored on the non-transitory computer-readable storage medium, and the instructions are executed by a processor to implement acts comprising:
acquiring a card type for a card to be displayed, wherein the card responds to an application program;
acquiring card real-time information corresponding to the card type according to the card type; and
displaying the card in a predetermined display format on a predetermined desktop based on the card real-time information, wherein the card being displayed comprises an entry skipping to an intermediate page corresponding to the card;
determining whether to download the application program based on the intermediate page; and
wherein the card has part of functions of the application program, and is loaded on the predetermined desktop to directly receive control of a user.

12. The non-transitory computer-readable storage medium of claim 11, wherein acquiring the card real-time information corresponding to the card type according to the card type comprises:
sending the card type to a specified server, wherein the specified server returns the card real-time information by interaction with an application server corresponding to the card type; and
receiving the card real-time information.

13. The non-transitory computer-readable storage medium of claim 11,
wherein the predetermined display format comprises: a title part, a content part, and a function part; and
wherein the title part is configured to display the card type, the content part is configured to display the card real-time information, and the function part is configured to provide a specified function of the card.

14. The non-transitory computer-readable storage medium of claim 11, wherein the acts further comprise:
when the entry skipping to the intermediate page is triggered, loading and displaying the intermediate page, and
wherein the intermediate page is a webpage that is provided by an application server of the card.

15. The non-transitory computer-readable storage medium of claim 11, wherein acquiring the card type to be displayed comprises:
acquiring a card type list, the card type list comprising at least one interested card type set by the user; and
acquiring the card type to be displayed from the card type list.

* * * * *